United States Patent
Von Krosigk et al.

(10) Patent No.: US 7,048,786 B1
(45) Date of Patent: May 23, 2006

(54) APPARATUS FOR TREATING A FLUID TO INCREASE OXYGEN CONCENTRATION AND REDUCE SURFACE TENSION

(76) Inventors: James Richard Von Krosigk, 2625 Cowey Rd, Nixon, TX (US) 78140; Larry John Dove, 214 Woodlane Drive, Okotoks, Alberta (CA) T1S 1S1

( * ) Notice: Subject to any disclaimer, the term of this patent is extended or adjusted under 35 U.S.C. 154(b) by 0 days.

(21) Appl. No.: 11/140,431

(22) Filed: May 27, 2005

Related U.S. Application Data

(60) Provisional application No. 60/576,277, filed on Jun. 1, 2004.

(51) Int. Cl.
*B03C 3/00* (2006.01)
*B01D 17/06* (2006.01)

(52) U.S. Cl. .......................... 96/54; 210/241; 210/243; 210/150; 210/748

(58) Field of Classification Search ................ 210/748, 210/150, 241, 243; 96/54

See application file for complete search history.

(56) References Cited

U.S. PATENT DOCUMENTS

| | | | |
|---|---|---|---|
| 4,214,962 A | 7/1980 | Pincon | 204/157.1 R |
| 4,274,970 A | 6/1981 | Beitzel | 210/748 |
| 5,304,289 A * | 4/1994 | Hayakawa | 205/701 |
| 6,623,695 B1 | 9/2003 | Malchesky et al. | 422/12 |

* cited by examiner

*Primary Examiner*—Chester T. Barry
(74) *Attorney, Agent, or Firm*—Buskop Law Group, P.C.; Wendy Buskop

(57) ABSTRACT

An apparatus for treating a fluid so as to increase oxygen content while reducing surface tension, The apparatus comprises a surface tension modification generator (STMG) comprising an STMG chamber for receiving a pressurized fluid at a first pressure. Probes disposed in the STMG chamber for emitting a frequency into the fluid to modify a physical characteristic of the fluid. The apparature also comprises a multi-chambered device including an inner chamber, an outer chamber enclosing the inner chamber for receiving fluid from the inner chamber, and at least two funnels for flowing fluid from the inside chamber to the outer chamber and creating a turbid fluid condition at a focus point to dissolve oxygen into the fluid forming an oxygenated fluid. A port is connected between the STMG and the inner chamber causing a fluid pressure drop from the STMG to the inner chamber.

19 Claims, 4 Drawing Sheets

US 7,048,786 B1

APPARATUS FOR TREATING A FLUID TO INCREASE OXYGEN CONCENTRATION AND REDUCE SURFACE TENSION

CROSS REFERENCE TO RELATED APPLICATIONS

The present application claims priority to U.S. Provisional Patent Application Ser. No. 60/576,277 filed on Jun. 1, 2004 now abandoned.

FIELD

The present embodiments relate to an apparatus for treating a fluid stream, such as one containing waste water, to increase oxygen content while reducing surface tension.

BACKGROUND

A need exists for a device to reduce the energy requirements of activated sludge industrial and municipal wastewater systems while substantially increasing the capacity of existing infrastructure; lowering the capital expenditure of future wastewater management facilities; and increase the specific capacity and reduce the cost of farm raised seafood crops by accelerating the growth rate of the crop via higher dissolved oxygen in the pond water.

A need exists for a home unit which can be used to treat potable water in a house to give beneficial effects to the occupants of the house based on increased oxygen uptake.

A need exists for an improved electronic device for energizing fluids, in particular water, that provides a benefit to living organisms, machinery, processes and substances. The needed device should be an electrostatic harmonic signal generator, frequency signal generators, two or more antennas, and a fluid conduit. When fluid is treated with the invention, the fluid will become energized and can be used to provide significant benefits in applications such as milk production, flower production, fruit production, crop production, vegetable production, shrimp production, egg production, meat production, gasoline combustion, waste fluid combustion, scale removal, water purification, fluid tracking, fluid sterilization and more.

A need exists for an improved electronic device to accelerate the cure time for concrete used in construction, and oil and gas drilling. A need exists for an improved electronic device to allow reverse-osmosis units to function at rates two to four times current levels.

The devices embodied herein are designed to meet these needs.

SUMMARY

The embodiments of the invention are for an apparatus for treating a fluid so as to increase oxygen content while reducing surface tension. The apparatus comprises a surface tension modification generator (STMG) comprising an STMG chamber for receiving a pressurized fluid at a first pressure.

A pair of probes are disposed in the STMG chamber with a first probe for emitting a frequency from about 0.05 Hz to about 5000 Hz, into the fluid and a second probe causing the emitted frequency to travel through the fluid for a defined distance to modify a physical characteristic of the fluid forming an altered fluid.

The invention also comprises a multi-chambered device for receiving the altered fluid from the STMG. The multi-chambered device comprises an inner chamber, wherein the inner chamber is for supporting altered fluid at a second pressure, wherein the inner chamber comprises an inner chamber axis and an inner chamber inlet for receiving altered fluid. The multi-chambered device further comprises an outer chamber enclosing the inner chamber for receiving fluid from the inner chamber, wherein the outer chamber further comprises an a outer chamber outlet, and wherein the fluid is at a third pressure in the outer chamber. The multi-chambered device further comprises at least two funnels for flowing fluid from the inner chamber to the outer chamber and creating a turbid fluid condition at a focus point to dissolve oxygen into the fluid forming an oxygenated fluid.

A port can be connected causing a fluid pressure drop from the STMG to the inner chamber, and wherein the port can be used for flowing oxygen or ozone into the inner chamber, and wherein the first pressure is greater than the second pressure.

BRIEF DESCRIPTION OF THE DRAWINGS

The present embodiments will be explained in greater detail with reference to the appended figures, in which.

Figure 1:
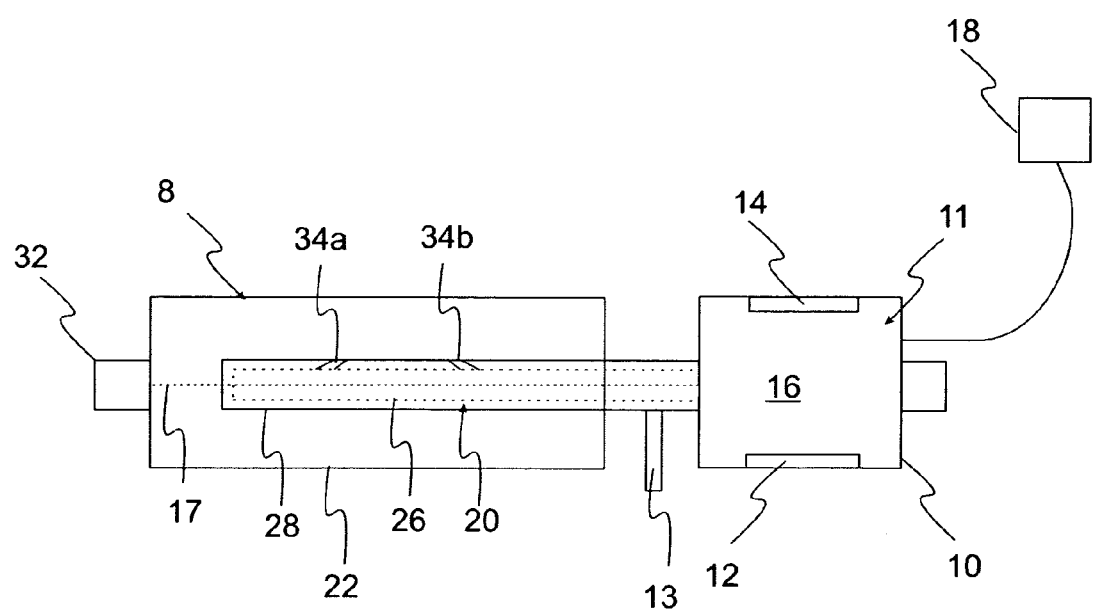
FIG. 1 depicts an overall diagram of an embodiment of the apparatus.

The present embodiments are detailed below with reference to the listed figures.

DETAILED DESCRIPTION OF THE EMBODIMENTS

Before explaining the present embodiments in detail, it is to be understood that the embodiments are not limited to the particular embodiments herein and it can be practiced or carried out in various ways.

The present invention is directed to a water treatment process that enhances the quality of the environment, by cleaning water and oxygenating the water using very little energy, compared to how waste treatment plants currently oxygenate the water.

The present invention was devised to help with sewage treatment, namely the enhancement of aerobic bacteria growth which can break down wastes.

Approximately 250 trillion gallons of water are used by the human race on earth each year, based on reports from the World Trade Organization in 2004. This figure represents 2% of the available water on earth of which 30% is polluted in some manner, requiring treatment before being used by humans.

It is noted that of the 250 trillion gallons of water, 60% is used for agricultural purposes, 15% is used for industrial purposes, and the rest is available for human consumption and use. The embodiments of this invention have beneficial effects that apply to all three areas by providing oxygenated water with reduced surface tension.

The present embodiments describe a device that creates sub-micron particles of oxygen that are dissolved in a fluid. "Sub-micron" can mean "nanosized" particles of oxygen ($10^{-9}$ sized particles).

With this device, the sub-micron particles of oxygen remain in the fluid where placed or sink to the bottom of a container holding the fluid with the oxygenated particles rather than rising to the surface and escaping.

The phenomenon of increasing dissolved oxygen in the fluid occurs because the sub-micron size of the oxygen particles are so small that the density of the fluid generally exceeds the upward force caused by the difference in density between the sub-micron oxygen particles and the fluid. The oxygen is suspended or sinks to the bottom, this phenomenon is created by not only passing the fluid through three different pressures, but by first treating with a surface tension modification generator, then injecting the oxygen, or perhaps ozone (if killing of bacteria is desired) into the fluid, then passing the modified fluid through an inside chamber of a multi-chamber device into an outer chamber using funnels that create a turbid flow condition at a triangular focal point.

The embodied devices use sub-micron oxygen generation technology in conjunction with an improved electrostatic device for energizing fluids, particularly useful for energizing water based fluids. By energizing the fluids, the surface tension of the fluids is lowered. The surface tension modification generator or "STMG" has a chamber with at least a pair of probes disposed in the chamber. The frequency is emitted from the first probe and transmits through the fluid until the frequency is received or grounded by the second probe. It is contemplated that the frequency can be between 0.05 Hz and about 5000 Hz. When the frequency travels through the fluid for a defined distance, it modifies a specific physical characteristic of the fluid, forming an altered fluid, that physical characteristic can be the surface tension of the fluid.

The embodied electrostatically induced surface tension reduction device can include an electrostatic voltage spike signal generator, two or more radio frequency signal generators, one or more antennas, a fluid conduit, and optionally one or more signal boosters.

The device can also utilize magnetic fields that it either generates or passes into the chamber of the STMG, hereafter termed the STMG chamber, to modify the fluid.

The device to reduce surface tension increases the capacity and cost effectiveness of a myriad of critical industrial water management processes including reverse-osmosis (sea water to potable water), de-scaling of industrial water cooling systems, emulsion breaking applications for chemical and oil refineries, chemical oxygen demand (COD) reduction in industrial plants, such as paper mills, and de-oiling of oil drilling fluids and drill bit cuttings from subsurface strata.

In an alternative use, this device can be used to reduce the surface tension of the water used in concrete and thereby increasing the strength of concrete while lowering the cost to produce the concrete.

The embodied devices "energize" a fluid by supplying an influx of variable energy waves, in the range of about 0.05 Hz to about 5000 Hz. The embodied devices energize the fluid by flooding the fluid with additional electrons or the equivalent in charge density.

In an embodiment, the invention can be a home unit which is used in a house to treat water for increasing oxygen consumption to the occupants of the house. The home unit can be wall mounted, or on a portable dolly. An industrial embodiment of the unit can be skid mounted. It is contemplated that the apparatus, if it is portable, would weigh in the range from about 30 to about 2000 pounds. The ability to provide a small unit, so that any family could take advantage of this process is a significant benefit in places where oxygen levels in water are reduced.

It has been found that the increased oxygen content in water for humans or animals can result in increased body's aerobic action in the digestive tract. The increased oxygen content with reduced surface tension can increase the human's ability to evacuate metals from the body and improve nutrient uptake to the body. This can work for pets, such as cats and dogs, the domestic farm animals that an individual might have, as well as the children of the household.

For example, in water, the device energizes the water and satisfies the hydrogen ion (H+) attraction to the unshared pair of electrons on any adjacent water molecules. In turn, a true reduction in hydrogen bonding between water molecules occurs. The true reduction in hydrogen bonding is measured as surface tension reduction. Typically, water molecules link up to each other because of the dipole nature of the individual water molecules. The bent water molecule structure in the free-state has three fundamental variations: symmetrical stretch, symmetrical bend, and the asymmetrical bend. The additional negative charges or the equivalent in charge density provided in the solution by the embodied devices reduce the bonding of the oxygen atoms of water molecules and the hydrogen atoms of other water molecules by supplying the negative charges (electrons) that the oxygen atoms attract. As a result, less hydrogen bonding exists between the individual water molecules. The result is "energized" water resulting in benefits such as better cleaning water and better soil-leaching water.

Table 1 summarizes the surface tension of water before and after the water is "energized" using the embodied devices. The water is tested at a range of temperatures.

TABLE 1

| TEMPERATURE (° C.) | SURFACE TENSION - "UN-ENERGIZED" (erg/cm2) | SURFACE TENSION - "ENERGIZED" (erg/cm2) |
| --- | --- | --- |
| 5 | 74.9 | 60.2 |
| 10 | 74.22 | 57.3 |
| 15 | 73.49 | 56.3 |
| 18 | 73.05 | 54.2 |
| 20 | 72.75 | 50.3 |
| 25 | 71.97 | 47.5 |
| 30 | 71.18 | 42.5 |
| 40 | 69.56 | 40.3 |
| 50 | 67.91 | 38.5 |
| 60 | 66.18 | 35.3 |
| 70 | 64.4 | 35.0 |
| 80 | 62.6 | 34.5 |

Combining the sub-micron oxygen generation with the energizing technologies provides a benefit to living organisms, machinery, processes, and substances. The increased presence of oxygen on the bottom of given fluid sources, such as a pond, affects the rate of microbial metabolic activity in the bottom of the pond. The embodiments of the invention provide a significant increase in the water treating capacity. The energy demand required by the embodiments is reduced by 96% for an equivalent volume fluid as compared to current technology.

When fluid is treated with the embodied apparatus, the energized and super oxygenated fluid can be used to provide significant benefits in applications such as milk production, flower production, fruit production, crop production, vegetable production, shrimp production, egg production, meat production, gasoline combustion, waste fluid combustion, scale removal, water purification, fluid tracking, fluid sterilization and more. The lowering of the surface tension benefits crops by enhancing the capillary action of the root system. That enhancement carries more oxygen into the plant due to the increased oxygenation of the water. The devices can be used to assist the transfer of oxygen into a plant or animal by reducing the energy required to overcome the surface tension of water allowing the water to assimilate into the animals or plants.

The embodied devices provide a quick and cost-effective manner to inject dissolved oxygen into a stream or body of water. For example, the devices can be used to create billions of nano-oxygen particles to transfer to the bottom of a sludge pond to aid in bio-remediation.

Ample dissolved oxygen (DO) is required for effective wastewater treatment from pulp and paper plants, or activated sludge from petrochemical plants. The embodied methods generate billions of nano-sized oxygen particles that are so small that the particles do not have enough mass to overcome the water's natural density and rise to the water's surface. In combination with surface tension reduction technology water's tendency to burst "bubbles" is also reduced. Therefore, the nano-sized oxygen particles sink or remain suspended in the water.

The embodied methods accelerate the rate of transfer of oxygen into water through the large surface area created by the enormous population of micro-particles. The generated nano-oxygen particles can be delivered at approximately 5 cubic feet/minute (CFM) of oxygen using a 0.5 HP pump.

With reference to the figures, FIG. 1 depicts an overall diagram of an embodiment of the apparatus for treating a fluid, such as a fluid stream containing water.

FIG. 1 shows the apparatus which includes a surface tension modification generator (STMG) (10) with a chamber (11) containing at least two probes (12 and 14), but 12 probes or more can be used within the scope of the invention. The probes (12 and 14) are located in a wall of the outer chamber and contact the fluid (16) from an outside source. The probes (12 and 14) work in pairs, one probe emitting a frequency and transmitting the frequency through the fluid (16) to a second probe which receives the frequency, causing the modification of the molecules in the fluid. In one embodiment, a first pair of probes generates and receives a first frequency, and a second pair of probes generates and receives the same frequency as the first set of probes. In another embodiment a first pair of probes generates and receives a first frequency and a second pair of probes generates and receives a second frequency. In still another embodiment, the first pair of probes can generate a first variable frequency pattern and a second pair of probes can generate the same variable frequency pattern. In yet another embodiment, the first pair of probes can generate a first variable frequency while a second pair of probes generates a second variable frequency. More probe pairs can be used with the same or different frequencies to the first pair of probes, depending on the size of the chamber in the STMG.

The STMG (10) depicted in FIG. 1, emits a frequency from about 0.05 Hz to about 5000 Hz into the fluid (16) through the probes (12 and 14) to minimize hydrogen bonding in the fluid (16). Frequencies are selected depending on the desired performance of the bacteria. Some frequencies can enhance bacteria performance, other frequencies can kill the bacteria which stops the processing of the solids or other matter in the fluid.

The STMG can use one frequency (rf), or variable (rf) frequencies. The frequencies change depending on variables programmed into the computer processor.

The radio frequency that can be used herein can be two or more distinct radio frequency (Rf) signals having variable ranges and pulse signals. The Rf signal generators, along with signal boosters and/or antenna, can cooperate to provide an improved electrostatic apparatus useful in particular surface tension reducing applications for fluids in order to enhance the oxygenation process. Similarly, the STMG can utilize a frequency created from a magnetic field generation apparatus.

The STMG (10) is can be powered from an energy source (18) but the external energy source is not used when a magnetic field generator is used.

The STMG (10) is in fluid communication with a multi-chambered device (8) which has an inner chamber and an outer chamber. Inner chamber (20) has an axis (17). The inner chamber (20) has an inlet for receiving pressurized fluid from the STMG. The inner chamber also receives a gas via a port (13) disposed between the STMG and the inner chamber.

The port (13) is shown for delivering gas from a gas source to the inside chamber, wherein the port in an embodiment is a venturi effect generator. Although the embodiments described emphasize oxygen and ozone the gas source can provide oxygen, ozone, air, ethylene, carbon dioxide, carbon monoxide, ethylene oxide, and other gases or combinations thereof.

The port can be a venturi effect generator, such as a Model 2081 from Mazzei Injectors of Ventura, Calif. The port can cause a drop in pressure of the fluid from the STMG to the inner chamber.

The inner chamber (20) with an interior side (26), and exterior side (28) is adapted to support the lowered pressure of the fluid result from influence provided by the Venturi effect generator.

As an example, in an apparatus according to the invention having a flow rate of 80 gallons a minute the STMG chamber pressure would be 50 psi. After the port, and entering the inner chamber, the pressure on the fluid would drop to 20 psi.

An inner chamber is surrounded and enclosed by the outer chamber and the inner chamber provides a fluid contact between the two chambers.

In one embodiment, the outer chamber (22) can be a tube with an outside chamber outlet (32). The outer chamber and walls can have various shapes, cylindrical, square, rectangular as long as it contains the inner chamber which can also be tubular and cylindrical, or be hollow with rectangular shapes, or other orthogonal shapes.

In an embodiment the outer chamber could be up to 2 feet long, with a diameter of about 4 inches, and wall thicknesses of about ¼ inch. The inner chamber could be 18 inches long, with a diameter of 2 inches and a wall thickness of about ⅜ inch.

The outer chamber is adapted to support a second pressure that is less than the first pressure in the inner chamber. The outer chamber can be up to 75% less in pressure than the inner chamber. For example, the inner chamber can have a pressure of 20 psi and the outer chamber would have a pressure of 5 psi.

The thickness of the outer chamber wall should be adequate to support the pressure in the outer chamber without deforming.

The outer chamber and the inner chamber can be made of a variety of materials including polyvinyl chloride, stiff elastomeric materials, fiberglass resin, CPVC resin, glass, metals, including stainless steel, plastic composites, or combinations of these materials. The outer chamber can be coated or fiber wrapped.

The outer chamber can be connected to an inner chamber by welding, if the outer chamber has walls of stainless steel, or if made of plastic or PVC, the chamber walls can be connected through a melted engagement, or the multichambered device can have one chamber of metal, such as the outside chamber and the inner chamber can be a polymer. The chambers in an alternative embodiment, can be adhered together, such as with epoxy, or a similar strong adhesive. If glass is used to form the multichambered device, it is contemplated that the glass would be glazed together. It is also contemplated that the chambers could be threaded together, clipped or otherwise fastened together in a non-removable fashion, which is also leak-tight.

The fluid to be treated can include liquids, mixtures, suspensions, solutions, suspended solids, fluidized solids or combinations thereof.

In one embodiment, the multi-chambered device would treat water, which can enter the device at a flow rate of about 80 gallons per minute, but it could be as slow as 5 gallons per minute and up over 500 gallons per minute, and even more. Oxygen would be flowed through the port at about 50 standard cubic feet per hour for the 80 gallons per minute embodiment, and could range from 3 standard cubic feet per minute to over 200 standard cubic feet per minute.

Continuing with FIG. 1, the inner chamber has at least two funnels (34a, 34b) in the wall of the inner chamber. The funnels are directed toward a focal point that causes a turbid fluid condition to enhance the dissolving of oxygen into the fluid on a molecular level.

Figure 2:
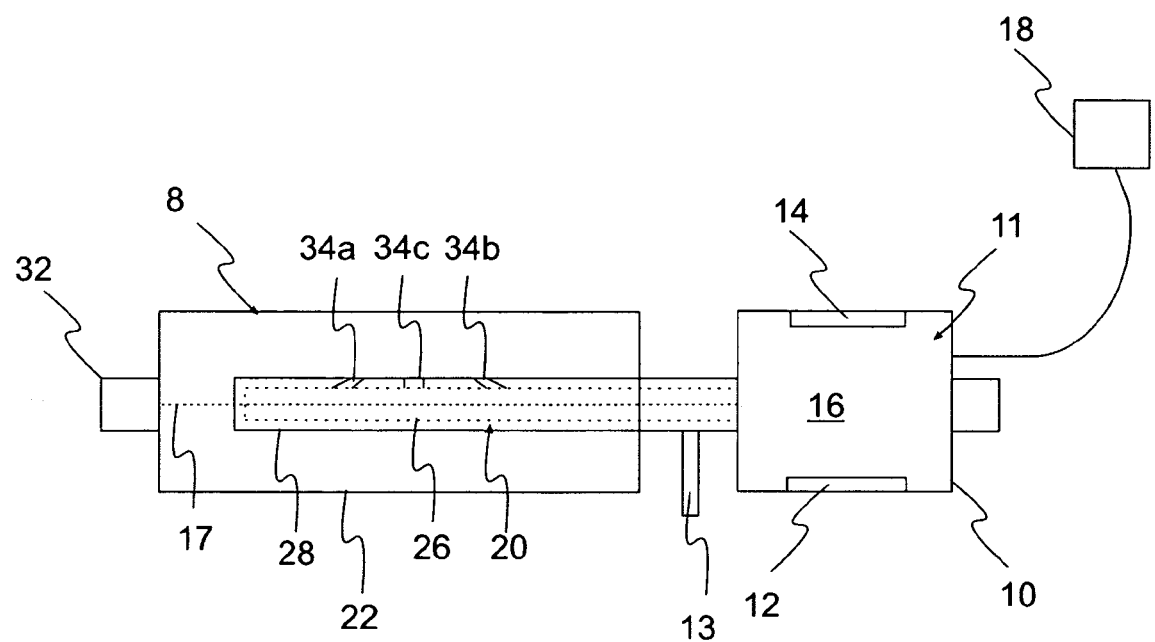
FIG. 2 depicts a perspective view of an embodiment of the first inner chamber with three funnels.

FIG. 2 shows three funnels (34a, 34b, and 34c) formed in the inner chamber (20) and directed at the outer chamber (22). In this embodiment, the funnels (34a, 34b, and 34c) are angled from about 45 to about 90 degrees from the axis (17) of the inner chamber.

The three funnels (34a, 34b, and 34c) of this figure are directed generally toward each other forming a focal point, which creates a turbid fluid area that causes oxygen to dissolve into the turbid fluid creating oxygenated fluid. This means, each funnel is generally directed toward the other two funnels of the trio, when three funnels are used.

Figure 3:
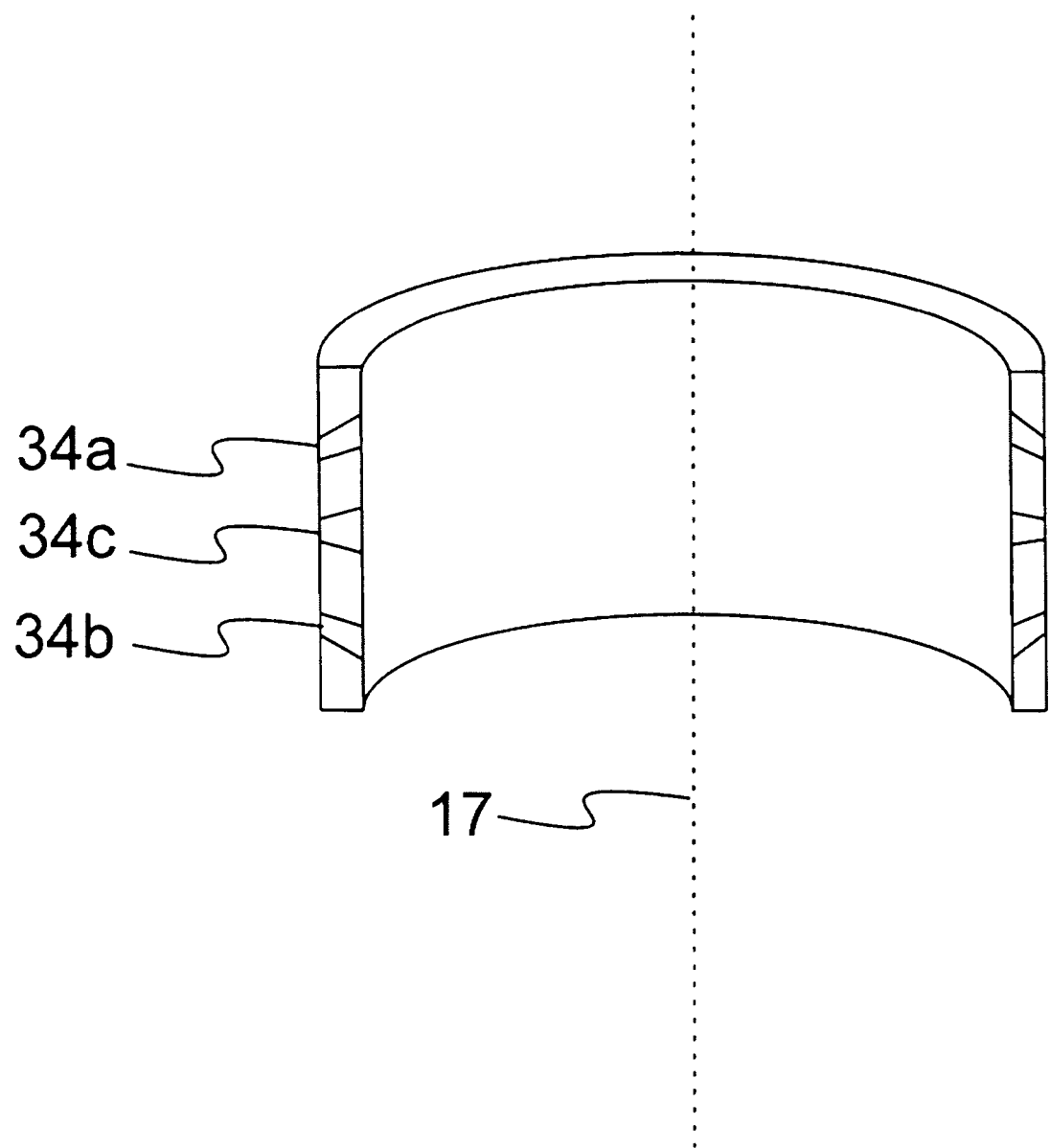
FIG. 3 depicts a cross section of FIG. 2's funnels.

FIG. 3 shows a cross section of an inner chamber with the 3 funnels (34a, 34b, 34c) directed at the outer chamber. The funnels (34a, 34b, 34c) are all aligned at from about a 45 to about 90 degree angle to the axis (17).

Figure 4:
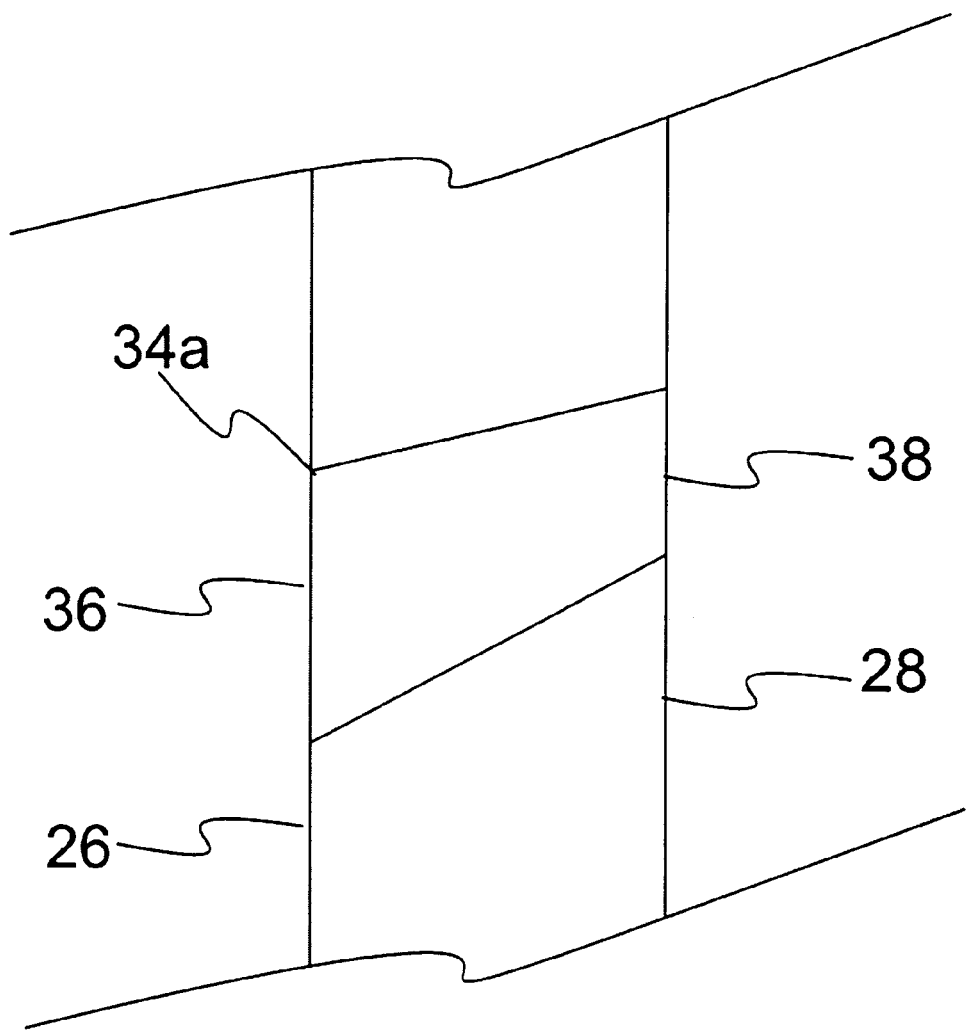
FIG. 4 depicts a cross sectional view of two of the funnels in the inner chamber.

FIG. 4 depicts a cross section of one of the funnels (34a). The funnel (34a) has a large opening (36) on the interior side (26) and a small opening (38) on the exterior side (28).

The small opening is located on the exterior side of the inner chamber and the large opening is located on the interior side of the inner chamber. In this FIG. 3, the funnels are angled from about 45 degrees to about 90 degrees from the axis of the inner chamber. The funnels are generally directed toward each other forming this turbid focal point, which is the result of a triangulation of the three funnels.

In other embodiments, the apparatus can include from three funnels to twenty-four funnels in the walls of the outer chamber, but up to 168 funnels or more can be used within the scope of the invention. Each funnel can have a large opening with a diameter from about ⅛ inch to about ¼ inch.

In an embodiment, the funnels can be located equidistant around the inner chamber.

In an alternative embodiment, the funnels can be disposed around the inner chamber at orientations 45 degrees, 90 degrees, and 180 degrees off the inner chamber axis.

The apparatus flows the fluid, which can be water, to be treated into the inner chamber at a first pressure and out of the inner chamber at a second pressure forming an lower pressure oxygenated stream in the outer chamber.

The first pressure can be from about 5% to about 40% greater than the second pressure. The fluid pressure drops as the fluid flows through the apparatus.

The outer chamber receives the oxygenated stream from the inner chamber.

The outer chamber can be a pipe or tube with an inner diameter ranging from about 2 inches to about 25 inches.

The embodied apparatus can be used to reduce chemical oxygen demand (COD) in waste streams.

The embodied apparatus can be used to cure concrete faster and more efficiently by increasing oxygen while reducing surface tension of the water to be added to the concrete mixture.

Utilizing the embodied devices enables electrochemical changes to occur that lowers the hydrogen bonding of water molecules; inhibits scale and corrosion formation; dissolves existing scale and corrosion; increases the cleaning power of water; slows or eliminates the uptake of metals into cellular structure; and breaks down and leaches away excessive salts from soil.

The embodied devices improve the performance of equipment, such as reverse-osmosis units by lowering the surface tension of salt contaminated water by anionic flooding.

The "energized" water that is an end product using the embodied devices has measurable benefits to all types of life forms, fluids, objects and processes. The "energized" water or other similar "energized" fluid is created by treating a source fluid with the embodied device to form an energized fluid bearing a negative charge.

The embodied electrostatic apparatus can subject the source fluid to a combination signal that includes a voltage spike and at least two controlled Rf signals with different radio frequencies. Plant growth can be enhanced with the device particularly when used with a computer controlled variable signal device.

The source fluid can include any known fluid, water, water-based fluids, or organic fluids. The source fluid can be a solution, suspension, emulsion, colloid, gel, or other such fluid. The energized fluid does not have to be de-energized before the fluid is used in manufacture, storage, transportation, relocation, and identification processes.

Exemplary mechanical benefits include improved octane rating of standard petroleum based fuels; reduction in pollutant formation during combustion of fuels; reduced curing time for concrete and mortar; reduction in perceived bitterness in plant extracts; and reduction in scale formation and build-up in fluid conduits. Agriculture and health benefits include improved sterilization of water with high microbial content; enhancement of flavor in drink syrup or concentrate; improved crop growth and condition, increased crop productivity, increased water percolation into soil, increased efficiency of fertilizers and nutrients; improved plant drought tolerance, and improved leaching of salts into subsoil. Other benefits are improved digestion of large organic molecules in living organisms.

The sub-micron particle dispersion devices were tested in concrete and mortar using the method. The results from the tests show that the resulting infused concrete exceeds 5000 psi crush strength in less than seven days of curing versus four weeks for the same concrete batch without sub-micron particle dispersion. The embodied sub-micron particle dispersion devices offer a profound impact on the economics of the construction and oil and gas drilling industries. Table II summarizes the results from the sub-micron particle dispersion devices tested in concrete and mortar. Batch Number 4 may have contained more water content than the others.

In this test five different waters were used as follows:

TABLE II

| Batch Number | % Saturation | Day 2/psi | Day 7/psi | Day 14/psi | Day 28/psi |
|---|---|---|---|---|---|
| 1 (control) | 94.2 | 1845 | 4265 | 4640 | 5340 |
| 2 (Surface tension only) | 92.4 | 2490 | 5500 | 6200 | 6820 |
| 3 (Oxygen Only) | 207.3 | 2725 | 5740 | 6200 | 7110 |
| 4 (Oxygen Only) | 415.0 | 1910 | 5235 | 6050 | 6645 |
| 5 (Oxygen and Surface tension reduction) | 380.0 | 2645 | 5840 | 6685 | 7400 |

While these embodiments have been described with emphasis on the embodiments, it should be understood that within the scope of the appended claims the embodiments might be practiced or carried out in various ways other than as specifically described herein.

What is claimed is:

1. An apparatus for treating a fluid so as to increase gas content while reducing surface tension, wherein the apparatus comprises:
   a. a surface tension modification generator (STMG) comprising an STMG chamber for receiving a pressurized fluid at a first pressure, at least a pair of probes disposed in the STMG chamber with a first probe for emitting a frequency from about 0.05 Hz to about 5000 Hz, into the fluid and a second probe causing the emitted frequency to travel through the fluid for a defined distance to modify a physical characteristic of the fluid forming an altered fluid;
   b. a multi-chambered device for receiving the altered fluid from the STMG, wherein the multi-chambered device comprises:
      i. an inner chamber, wherein the inner chamber is for supporting altered fluid at a second pressure, wherein the inner chamber comprises an inner chamber axis and an inner chamber inlet for receiving altered fluid;
      ii. an outer chamber enclosing the inner chamber for receiving fluid from the inner chamber, wherein the outer chamber further comprises an a outer chamber outlet, and wherein the fluid is at a third pressure in the outer chamber;
      iii. at least two funnels for flowing fluid from the inner chamber to the outer chamber and creating a turbid fluid condition at a focus point to dissolve gas into the fluid forming dissolved gas in a fluid mixture, and
   c. a port connected causing a fluid pressure drop from the STMG to the inner chamber, and wherein the port can be used for flowing gas into the inner chamber, and wherein the first pressure is greater than the second pressure.

2. The apparatus of claim 1, wherein from about 2 to about 12 probes are used.

3. The apparatus of claim 2, wherein at least one pair of probes generates and receives a first frequency, a second pair of probes generates and receives either the first frequency or a second frequency.

4. The apparatus of claim 2, wherein a plurality of pairs of probes are used in the STMG, and at least one pair of probes generates and receives a frequency different from a generated and received frequency from a second pair of probes.

5. The apparatus of claim 1, wherein the gas is oxygen, ozone, air, ethylene, carbon dioxide, carbon monoxide, ethylene oxide, or combinations thereof.

6. The apparatus of claim 1, wherein each funnel is angled from about 45 to about 90 degrees from the axis of the inner chamber.

7. The apparatus of claim 1, wherein each funnel is generally directed toward the focus point of another funnel.

8. The apparatus of claim 1, wherein the port is a venturi effect generator.

9. The apparatus of claim 1, wherein the port causes a pressure drop from the STMG to the inner chamber.

10. The apparatus of claim 1, wherein the quantity of funnels in the STMG channel ranges from 2 to 168 funnels.

11. The apparatus of claim 1, wherein the inner chamber is non-removably connected to the outer chamber.

12. The apparatus of claim 1, wherein the chambers comprises a stainless steel, polyvinyl chloride, a stiff elastomeric material, glass, other metals and alloys thereof, fiberglass, plastic composites, or combinations thereof.

13. The apparatus of claim 1, wherein the fluid comprises a member of the group consisting of: water, suspensions, mixtures, solutions, and combinations thereof.

14. The apparatus of claim 1, wherein the STMG generates a radio frequency.

15. The apparatus of claim 1, wherein the STMG generates a variable frequency.

16. The apparatus of claim 1, wherein the STMG utilizes a frequency created from a magnetic field generator.

17. The apparatus of claim 1, wherein the apparatus is portable, and wherein the apparatus has a weight from about 30 pounds to about 2000 pounds.

18. The apparatus of claim 1, wherein the apparatus is wall mounted, dolly mounted, skid mounted, and combinations thereof.

19. The apparatus of claim 1, wherein the first pressure is a high pressure, the second pressure is between the first pressure and a third pressure, and the third pressure is lower than the first pressure.

* * * * *